March 10, 1959     D. WILSON     2,876,937
DISPENSING CONDUIT FOR A LIQUID DISPENSER
Filed Jan. 11, 1957
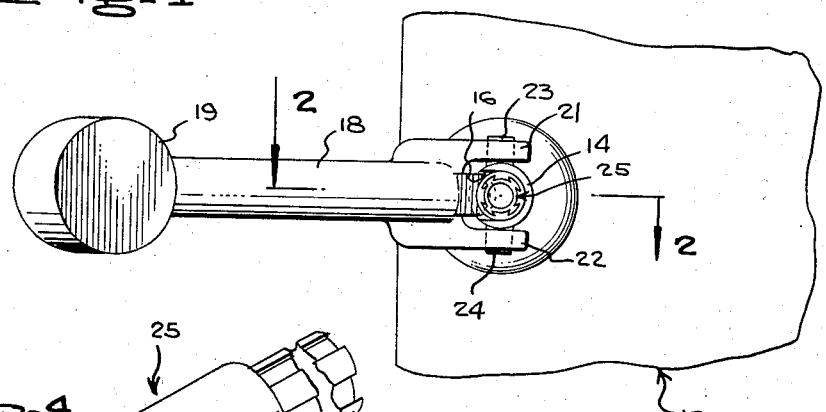
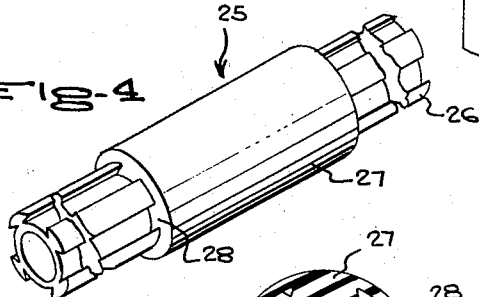
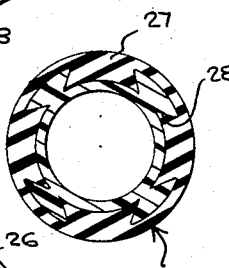
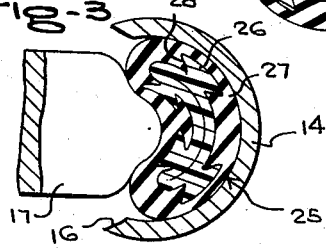
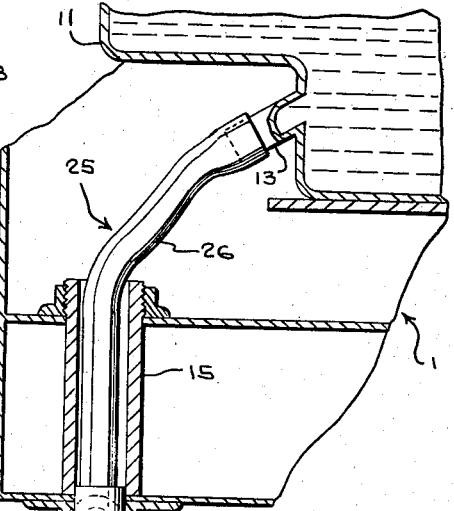
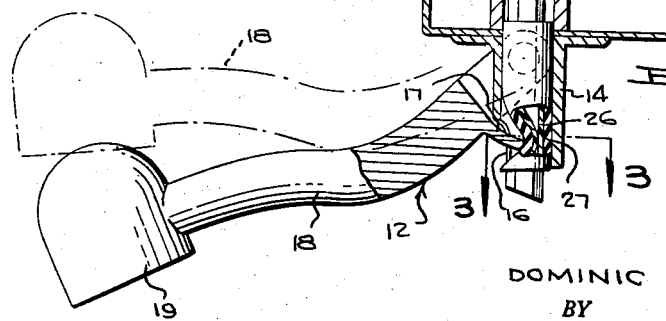
INVENTOR.
DOMINIC WILSON
BY
McMorrow, Berman + Davidson
ATTORNEYS

2,876,937
DISPENSING CONDUIT FOR A LIQUID DISPENSER

Dominic Wilson, Hartford City, Ind.

Application January 11, 1957, Serial No. 633,668

2 Claims. (Cl. 222—529)

The present invention relates to a flexible dispensing conduit for a liquid dispenser of the type used to dispense milk and other liquids in commercial establishments.

An object of the present invention is to provide a dispensing conduit which lends itself to the replacement of flexible conduits presently in use in liquid dispensers in commercial establishments, such dispensers being provided with a pressure applicator for pinching the conduit as a means for shutting off the flow of the liquid to be dispensed, such conduits as are presently in use being fabricated either of a material which imparts a taste or odor to the dispensed liquid such as milk, or other material which lacks the necessary resiliency to return to its unclosed shape after repeated closing by the application of such pinching pressure.

Another object of the present invention is to provide a dispensing conduit which lends itself to manufacturing in quantity and of less expensive material than used in conduits presently in use as provided in liquid dispensers, a conduit which may be packaged in sterile condition, one which is easily attached to the nipple of the dispenser receptacle and is easily assembled in the pressure applying device of the dispenser, one which has relatively long life, does not impart a taste or odor to the liquid dispensed, and one which is highly effective in action.

These and other objects and advantages of the present invention will be fully apparent from the following description when taken in connection with the annexed drawing, in which:

Figure 1 is a fragmentary bottom view of a portion of a support for a dispenser receptacle, showing the valve or pressure applying means;

Figure 2 is a view partially in section taken on the line 2—2 of Figure 1, showing in full lines the pressure applying means in a position closing the conduit and showing in dotted lines the position of the pressure applying means when the conduit is open;

Figure 3 is a sectional view, on an enlarged scale, taken on the line 3—3 of Figure 2, showing the conduit in closed position;

Figure 4 is a perspective view of the conduit according to the present invention; and Figure 5 is a sectional view of the conduit showing it in uncollapsed or unclosed condition.

Referring in greater detail to the drawing in which like numerals indicate like parts throughout the several views, the dispensing conduit, according to the present invention, is for use with a liquid dispenser such as is used to dispense relatively small quantities of milk or other liquids in restaurants or other commercial establishments, such a dispenser being indicated in Figures 1 and 2 by the reference numeral 10 and including a receptacle 11 and a valve assembly indicated generally by the reference numeral 12. The receptacle 11 is provided with an outlet tube 13 adjacent the bottom thereof. The valve assembly 12 consists in a downwardly depending tube 14 positioned exteriorly of the dispenser 10 and connected in communication with an upright nipple 15 which extends upwardly through the bottom of the dispenser 10 towards the bottom of the receptacle 11. The lower end of the tube 14 is provided with a cutaway portion indicated by the reference numeral 16 in Figures 1 to 3, inclusive, through which extends a tongue member 17 projected from the undersurface of an arm 18 having a weighted handle portion 19 on the free end thereof. The arm 18 has its other end bifurcated to provide a pair of supports 21 and 22 having apertures therein receiving the adjacent bosses 23 and 24, respectively, formed on the exterior of the tube 14 and providing a pivotal connection for the arm 18 for movement from the full line position (Fig. 2) in which the tongue member 17 extends into the cutaway portion of the tube 14 to the dotted line position in which the tongue member 17 is substantially out of the cutaway portion 16.

Conduits presently in use for connecting the tube 13 to the tube 14 have been generally disappointing in service. Some conduits have been manufactured from rubber which has a tendency to impart taste and odor to the milk dispensed from the receptacle 11 and other conduits have been fabricated of flexible plastic and the like which do not impart any taste or odor but which, on the other hand, have relatively short lives for the reason that they cannot be pinched repeatedly by any pressure applying device because the material from which the latter conduits are fabricated does not permit the conduit to return to its unclosed or round condition.

The conduit, according to the present invention, is an improvement over such above-mentioned conduits and corrects the deficiencies of such conduits. The conduit is indicated generally by the reference numeral 25 and consists in an inner conduit 26 and an encasement or sleeve 27, constituting an outer conduit. The sleeve 27 is resilient and fabricated of rubber or like material having a high degree of resiliency and it is circumposed about the inner conduit 26 intermediate the ends of the latter. Interlocking means is provided detachably securing the sleeve 27 and the inner conduit 26 and consists in undercut longitudinally arranged splines 28 formed on the outer wall of the inner conduit 26 and the inner wall of the sleeve 27, the splines 28 being of such size and shape as to conformably fit within each other to detachably secure the sleeve 27 on the inner conduit 26.

The conduit of the present invention has its upper end of the inner conduit 26 adapted to be secured about the end portion of the tube 13 so that the interior of the conduit 25 is connected in communication with the interior of the receptacle 11. With the sleeve 27 circumposed about a part of the inner conduit 26, that part of the inner conduit 26 is inserted within the nipple 15 and pushed downwardly to a position in which it is directly opposite the cutaway portion 16 of the tube 14. Upon application of an externally directed force such as the tongue member 17, the part of the sleeve 27 adjacent the cutaway portion 16 of the tube 14 is adapted to press the adjacent part of the inner conduit 26 against an opposed part of the inner conduit 26 to effect the flattening and closing of the inner conduit 26, thereby preventing flow of liquid therethrough. The conduit 25, according to the present invention, permits the use of plastic material for the inner conduit 26. Such plastic material will not impart taste or odor to milk or other liquids. The sleeve 27 is preferably formed of natural or synthetic rubbers of high resiliency. After the arm 18 has been raised, the resiliency of the sleeve 27 causes it to spring back to its normally cylindrical condition pulling the inner conduit with it and opening the inner conduit 26. It is the feature of the present invention that the sleeve 27 and the inner conduit 26 be formed separately and be detachable one from the other and the inner conduit 26 may be sterilized

What is claimed is:

1. In a dispensing conduit fabricated wholly of flexible material and having one end adapted to be attached to a source of liquid to be dispensed and having the other end adapted to discharge the liquid therein from said source, the improvement consisting in providing a resilient sleeve about a part of said conduit intermediate the ends thereof, interlocking means on said conduit and on said sleeve detachably receiving said sleeve on said conduit, said sleeve being adapted upon application of an externally directed force to a part thereof to press the adjacent part of said conduit against an opposed part of said conduit and block off the opening in said conduit.

2. In a dispensing conduit fabricated wholly of flexible material and having one end adapted to be attached to a source of liquid to be dispensed and having the other end adapted to discharge the liquid received therein from said source, the improvement consisting in providing a resilient sleeve about a part of said conduit intermediate the ends thereof, interlocking means embodying undercut splines on the outer wall of said conduit and on the inner wall of said sleeve detachably securing said sleeve on said conduit, said sleeve being adapted upon application of an externally directed force to a part thereof to press the adjacent part of said conduit against an opposed part of said conduit and block off the opening in said conduit.

References Cited in the file of this patent

UNITED STATES PATENTS

| | | |
|---|---|---|
| 470,776 | Beehler | Mar. 15, 1892 |
| 2,377,261 | Norris | May 29, 1945 |
| 2,549,207 | Kestenbaum | Apr. 17, 1951 |
| 2,804,243 | Davenport | Aug. 27, 1957 |